United States Patent [19]

Komori et al.

[11] 4,080,064
[45] Mar. 21, 1978

[54] COPYING APPARATUS

[75] Inventors: Shigehiro Komori, Yokohama; Masao Ariga, Kawasaki; Hiroyuki Hattori, Naka; Hiroshi Ogawa, Kawasaki; Katsuichi Shimizu, Hoya, all of Japan

[73] Assignee: Canon Kabushiki Kaisha, Tokyo, Japan

[21] Appl. No.: 739,740

[22] Filed: Nov. 8, 1976

[30] Foreign Application Priority Data

Nov. 18, 1975 Japan .............................. 50-138498
Nov. 18, 1975 Japan .............................. 50-138499

[51] Int. Cl.[2] ...................... G03G 15/00; G03B 27/48
[52] U.S. Cl. ......................................... 355/51; 355/11
[58] Field of Search ................. 355/60, 66, 47–51, 355/8, 11

[56] References Cited

U.S. PATENT DOCUMENTS 3,740,133   6/1973   Komori et al. .................. 355/51 X
3,833,296   9/1974   Vola et al. ..................... 355/51
4,013,361   3/1977   Allis ............................ 355/60

Primary Examiner—Donald A. Griffin
Attorney, Agent, or Firm—Fitzpatrick, Cella, Harper & Scinto

[57] ABSTRACT

A copying apparatus comprises an original supporting table having a transparent plate for supporting thereon an image original to be copied, scanning mirror means having a first and a second movable mirror for scanning the image original on the original supporting table without varying the length of the light path thereof to project the image original, a plurality of stationary mirror means stationary during copying operation, lens means disposed in a first light path formed by the mirror means for focusing the image of the original onto a photosensitive medium, and means for newly forming a second light path at a position out of the way of the scanning mirror means by displacing the lens means or by varying the angle of reflection of one of the stationary mirror means.

11 Claims, 12 Drawing Figures

FIG. 4
FIG. 5
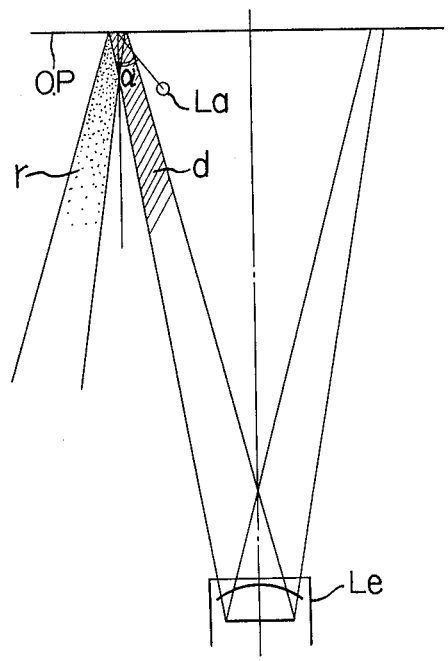
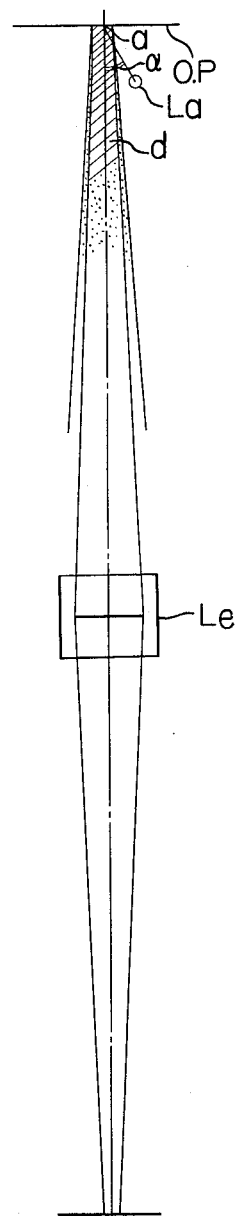

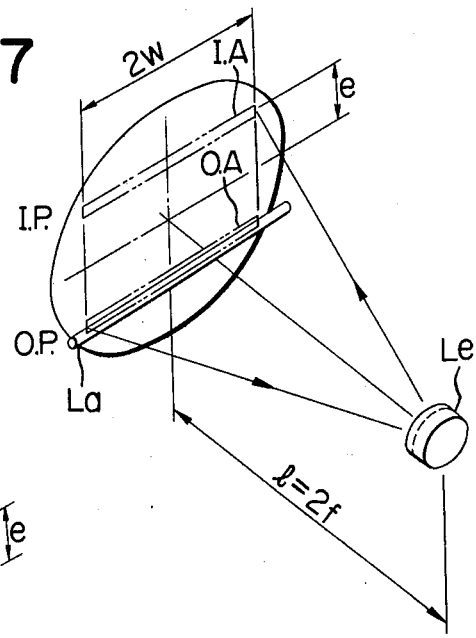
FIG. 7
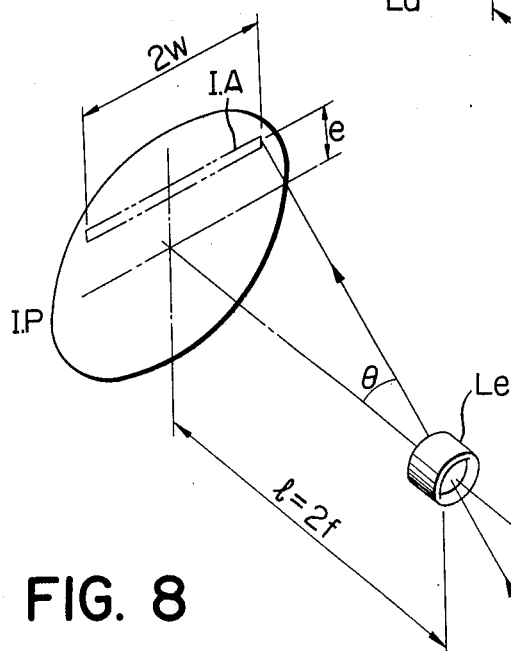
FIG. 6
FIG. 8
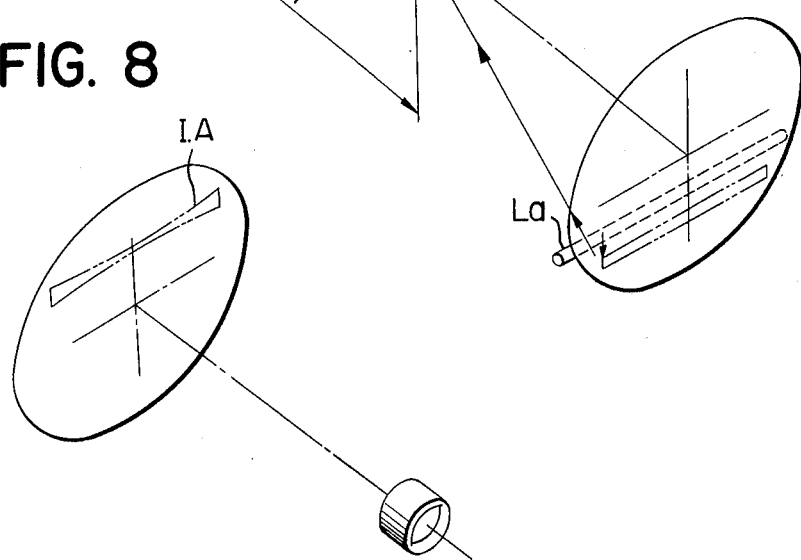

COPYING APPARATUS

BACKGROUND OF THE INVENTION

1. Field of the Invention

This invention relates to a copying apparatus which can perform two copying modes, for example, copying of thick originals and copying of sheet originals, and more particularly to a copying apparatus which provides a change-over between the two modes.

2. Description of the Prior Art

The two-mode copying apparatuses have heretofore been grouped into two types, one of which is the so-called movable original carriage type in which a reciprocally movable original carriage is provided with a thick original supporting table and a sheet original feed device, and the other is the type in which the optical scanning system is moved with the original carriage maintained stationary during both modes of operation.

In the reciprocable original carriage type copying apparatus, the original carriage juts outwardly of the apparatus body so that the necessary scanning area of the copying apparatus is increased. In the movable optical scanning type copying apparatus, a light path for thick originals and a light path for sheet-like originals must be formed independently of each other. Thus, both types of the copying apparatus have tended to become bulky.

At the same time, these copying apparatuses have both been complicated in construction and have not been sufficient in respect of economized power consumption and increased copying speed.

SUMMARY OF THE INVENTION

It is an object of the present invention to provide pg,3 a two-mode copying apparatus in which change-over between the two modes may be accomplished simply by displacement of optical means.

It is another object of the present invention to provide a copying apparatus in which change-over of two light paths for two modes may be accomplished by displacement of movable mirrors in the optical system.

It is still another object of the present invention to provide a copying apparatus in which change-over of the light paths for two modes may be accomplished by displacement of a lens of the optical system.

It is another object of the present invention to provide a copying apparatus in which the image of a sheet-like original may be projected by the movable mirrors of the optical system being displaced out of the light path for sheet-like originals.

It is a further object of the present invention to provide a copying apparatus in which change-over of the light paths for two modes may be accomplished by varying the angle of reflection of the stationary mirror of the optical system.

It is a further object of the present invention to provide a copying apparatus in which the lens is moved in a direction perpendicular to the optical axis thereof to form a light path for sheet-like originals.

It is a further object of the present invention to provide a copying apparatus which has automatic sheet original transport means.

It is a further object of the present invention to provide a copying apparatus in which an automatic sheet original transport means is disposed so as not to interfere with the original supporting table.

It is also an object of the present invention to provide a copying apparatus which is compact and of high performance. Particularly, the present invention provides a compact desk top copying apparatus, and also has an appropriately constructed optical system to enable higher copying speeds to be realized with reduced power consumption by the use of a conventional photosensitive medium and illuminating means, and which has various features as will hereinafter be described.

The invention will become more fully apparent from the following detailed description thereof taken in conjunction with the accompanying drawings.

BRIEF DESCRIPTION OF THE DRAWINGS

FIGS. 4, 5, 6, 7 and 8 comparatively illustrate the illuminations in the cases where the reflection type lens and the transmission type lens are used respectively.

DESCRIPTION OF THE PREFERRED EMBODIMENTS

Figure 1:
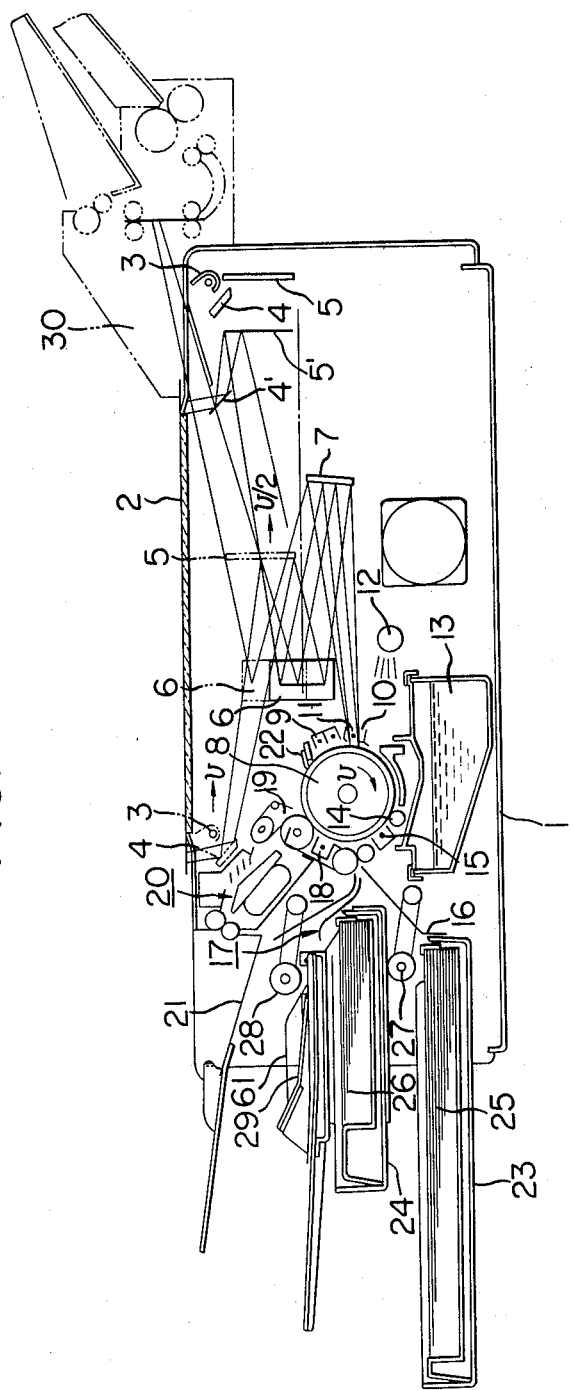
FIG. 1 is a longitudinal cross-sectional view showing a first embodiment of the copying apparatus according to the present invention.
Figure 2:
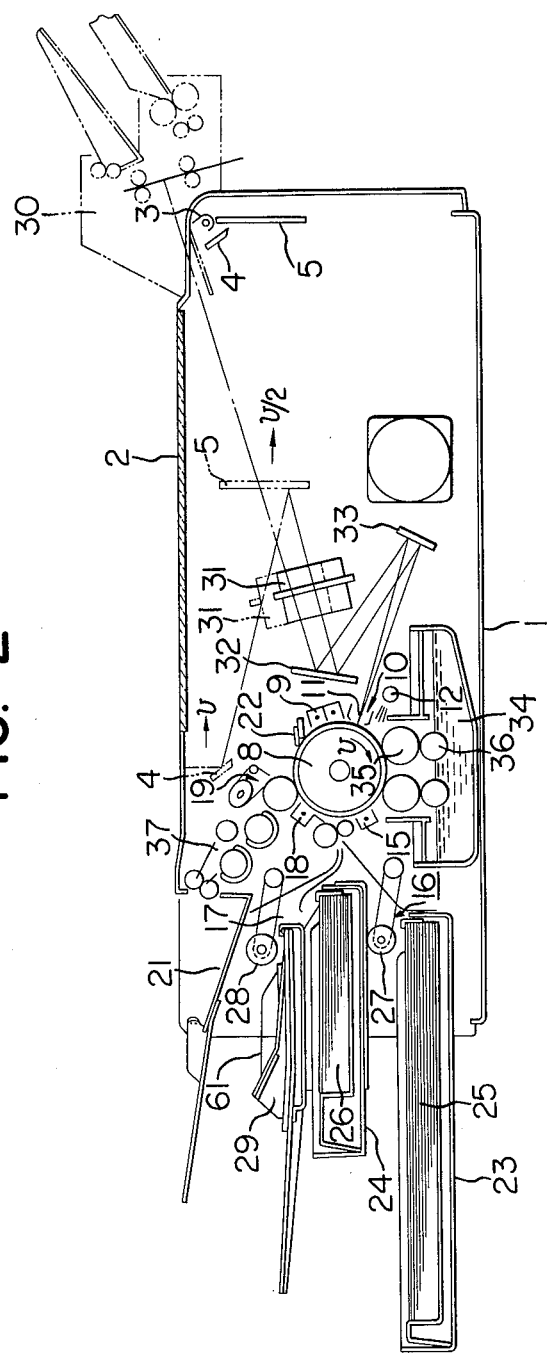
FIG. 2 is a longitudinal cross-sectional view showing a second embodiment of the copying apparatus according to the present invention.
Figure 3:
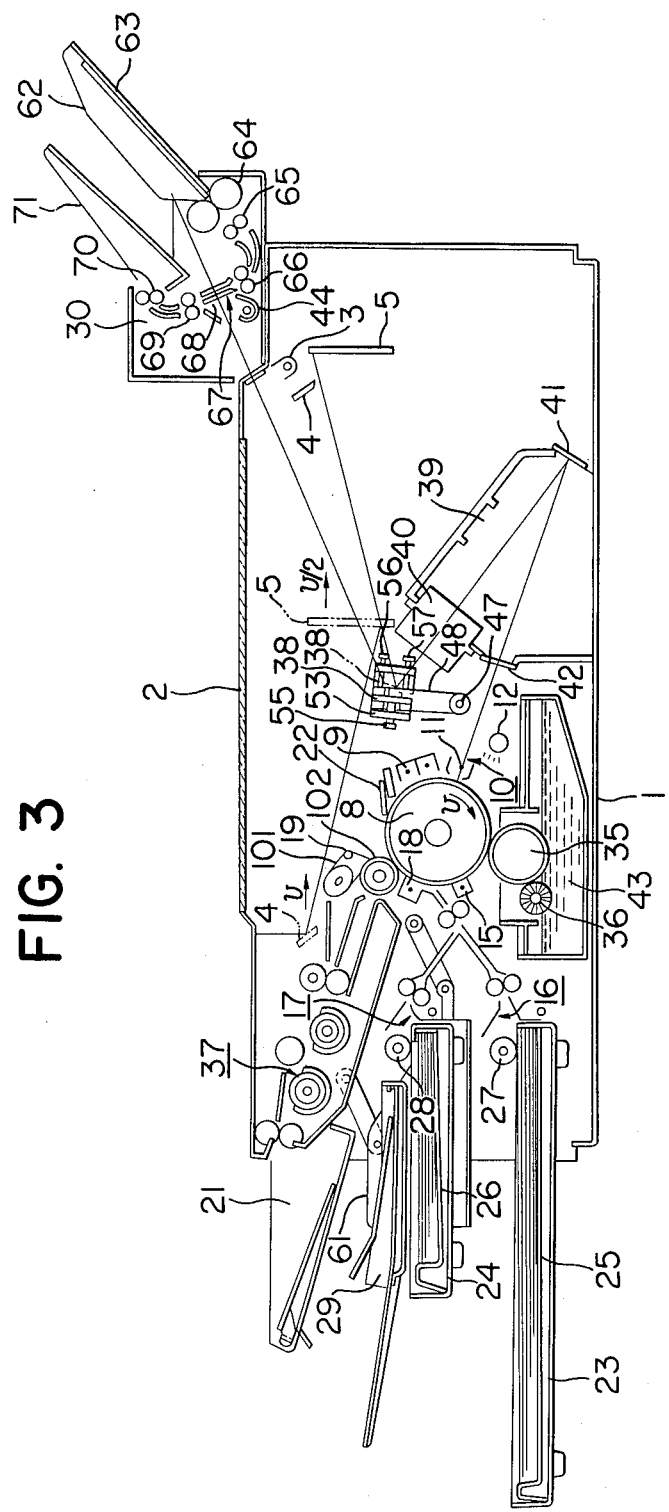
FIG. 3 is a longitudinal cross-sectional view showing a third embodiment of the copying apparatus according to the present invention.

An embodiment of the copying apparatus according to the present invention is shown in FIG. 1, and further developed forms thereof are shown in FIGS. 2 and 3.

In FIG. 1, the main body 1 of the copying apparatus has on top thereof a transparent glass plate 2 for supporting thereon an image original. An image original may be placed on the transparent glass plate 2, and there is provided an optical system comprising an illumination unit consisting of an illumination lamp 3 and a first movable mirror 4 integral therewith, a second movable mirror 5, an in-mirror lens 6 and a stationary mirror 7. The image original is illuminated by the illumination lamp 3 and the image light is passed via the in-mirror lens 6 and the stationary mirror 7 and focused on a drum 8 through an exposure slit while the length of the light path is maintained equal by the first movable mirror 4 moved with the lamp 3 and the second movable mirror 5 moved at half the velocity of the first movable mirror 4. The illumination lamp 3, the first movable mirror 4 and the second movable mirror 5 are normally at the rightmost end position as viewed in FIG. 1 indicated by solid lines (this position will hereinafter be described as the home position), and during copying, they are first moved to their left position as indicated by dots-and-dash line, and then begin to scan the image original rightwardly (in the direction of arrow). For the production of a single copy, the movable mirrors return and rest at their rightmost end position after the scanning of the original, whereas for the production of multiple copies, they do not return to their rightmost end position after one cycle of scanning, but immediately come back from a predetermined position below the transparent glass plate 2 to the dots-and-dash line position whereat scanning of the image original is to start, thus resuming the scanning of the original. Similar operation is thereafter repeated until the last copy is completed, whereafter they return to the home position. During the production of multiple copies, the position at which the scanning is terminated differs depending on the size of the original to be copied, and 4' and 5' respectively designate the positions whereat the first 4 and the second movable mirror 5 terminate the scanning in the case of a maximum size original. The surface of the drum 8 has a photosensitive medium comprising a photosensitive layer covered with a transparent insulating layer. The photosensitive medium is first charged to the positive polarity by a positive high voltage from a positive charger 9. Subsequently, at an exposure station 10, the photosensitive medium is exposed to the image light which is focused on the drum 8 with the aid of the movable mirrors 4,5, the in-mirror lens 6 and the stationary mirror 7 as the result of the image original on the transparent glass plate 2 being illuminated by the illumination lamp 3 while, at the same time, the photosensitive medium is subjected to AC discharge by AC high voltage from an AC discharger 11. Next, the photosensitive medium is subjected to allover exposure by an allover exposure lamp 12, so that an electrostatic latent image is formed on the drum surface (photosensitive medium), and then the photosensitive medium enters a developing device 13. The developing device may be, for example, a dish-shaped developing device using liquidous developer. By this, the electrostatic latent image is developed into a visible image. The photosensitive drum further passes by an electrode roller 14 disposed adjacent the drum surface and rotatable in any one direction as required, and a post-charger 15 for positively or negatively charging as required, whereby there is kept a well-defined image on the drum surface. Subsequently, a copy medium fed from one of feeding sections 16 and 17 is brought into intimate contact with the surface of the drum 8 so that the image on the drum 8 is transferred onto the copy medium by the charging of a positive high voltage from an image transfer charger 18. After the image transfer, the copy medium is separated from the drum 8 at a separating section 19 and directed to a fixing section 20 for fixation of the image, whereafter the copy medium is discharged onto a discharge tray 21. In the meantime, the drum surface (photosensitive surface) is cleaned by a blade 22 urged thereagainst to remove any residual toner, thus becoming ready for use in another cycle of copying. Copy medium may be fed from one of two independent feeding sections 16 and 17. These feeding sections are respectively loaded with independent cassettes 23 and 24 which contains copy mediums 25 and 26, respectively. The copy mediums 25 and 26 in the respective cassettes are suitably fed from one of the cassettes by means of a feed roller 27 or 28. The lower cassette 23 is mounted detachably but securely within the copying apparatus body 1, while the upper cassette 24 is mounted on a cassette table 61 integrally with an overlying auxiliary cassette 29, so that the cassette table 61 and cassette 24 may be bodily displaced with respect to the feeding section 17 by a link or the like mounted within the main body 1. The cassette 24 is normally at its feeding position in the feeding section, but when required, the auxiliary cassette 29 may be brought to the feeding position in the feeding section so that copy mediums be fed therefrom. When the auxiliary cassette 29 becomes empty, the cassette 24 is again returned to the feeding section 17 so that copy mediums may be fed from the cassette 24. Where sheet-like image originals are to be copied, an automatic feed device 30 disposed at the upper right portion of the main body 1 may be utilized. In FIG. 1, this device is shown to be detachable with respect to the main body, but it may also permanently be secured to the main body. When this device is utilized, the movable mirrors 4 and 5 remain stationary at the home position. When the in-mirror lens 6 is moved to the dots-and-dash line position by a changeover switch, the light from an image original within the automatic feed device is directed via the in-mirror lens 6 and the stationary mirror 7 onto the drum 8. The path of light from the movable mirror 4 to the movable mirror 5 should preferably be at 8° to 20° with respect to the plane of the transparent glass plate. Where sheet-like originals are to be copied, what has been described just above is the only difference from the described construction used to copy book-like originals.

A further developed embodiment will now be described by reference to FIG. 2. This embodiment differs from the embodiment of FIG. 1 only in the arrangement of the optical system and the constructions of the developing device and fixing device, and is entirely the same as the FIG. 1 embodiment in the other points of construction and function. Therefore, those parts of FIG. 2 given the same reference numerals as those used in FIG. 1 are entirely identical in construction and function to those in FIG. 1, although they are somewhat different in shape and arrangement. The image light from the image original resting on the transparent glass plate 2 is directed via the first movable mirror 4, the second movable mirror 5, a transmission type lens 31 and stationary mirrors 32, 33 and passed through an exposure slit onto the drum 8. Development of the formed latent image, unlike the dish-type development shown in FIG. 1, is carried out by two sets of developing rollers 35 disposed within a developing device 34. Each of the developing rollers 35 may comprise a shaft as a core metal covered with an insulative elastic material (such as sponge or the like) which is easily impregnable with liquid and an electrically conductive film in fine mesh form overlaid on the insulative elastic material, or a shaft covered with an electrically conductive, elastic material (such as electrically conductive foamed rubber or the like) which is easily impregnable with liquid and an insulative film in fine mesh form overlaid on the conductive elastic material. The developing rollers 35 are urged against the drum 8 to some extent. Provided below the developing rollers 35 are rollers 36 which are urged against the rollers 35 to clean the surfaces thereof and to make uniform the toner density and supply the developing liquid to the rollers 35. Each of these rollers 36 comprises a shaft as core metal covered with sponge-like rubber which is in turn provided with hair. The developing rollers 35 are rotated in synchronism with and in the same direction as the drum 8 so that they do not disturb the image formed on the drum surface. A copy medium, after being separated from the drum 8, is subjected to fixation by a hot roller fixing device 37 which differs from the hot plate fixing device 20 shown in FIG. 1. In FIG. 2, when sheet-like originals are to be copied, the automatic feed device 30 may be utilized simply with the transmission type lens 31 displaced to the dots-and-dash line position because the home position of the movable mirrors 4 and 5 lies at the rightmost end of the main body 1. In this case, the light from the image original is passed through the transmission type lens 31 and via the stationary mirrors 32, 33 to be focused on the drum 8.

Reference will now be had to FIG. 3 to describe still another embodiment of the present invention. In FIG. 3, those parts given the same reference characters as those in FIGS. 1 and 2 are entirely identical in construction and function to those in FIGS. 1 and 2, although they differ in shape and arrangement. The image light from the original on the transparent glass plate 2 is directed via the first movable mirror 4, the second movable mirror 5 and a change-over mirror 38 to a transmission type lens 40 securely mounted in a dark box 39. The light passed through the transmission type lens 40 is further directed via a stationary mirror 41 secured to the rightward lower portion of the dark box 39 and passed through a dust-proof glass plate 42 provided to the dark box 39, and is finally focused on the drum 8. A developing device 43 is entirely the same in construction as that shown in FIG. 2 with the only exception that it comprises a single developing roller 35. In the other points of construction, the embodiment of FIG. 3 is entirely the same as the embodiment of FIG. 2. When a book or other thick original is copied, the change-over mirror 38 is at a position indicated by dots-and-dash line, but when sheet-like originals are to be copied, the change-over mirror 38 may be brought to the solid-line position, whereby the automatic feed device 30 may be utilized intact because the movable mirrors 4 and 5 lie at the right-most end of the main body 1. In this latter case, the light from the original is directed via the change-over mirror 38, the transmission type lens 40 to be the stationary mirror 41 and focused on the drum 8. The apparatus of this embodiment permits change-over between the thick original copying mode and the sheet original copying mode to be accomplished without the lens being moved. This is a great difference from the embodiments of FIGS. 1 and 2. Again, the apparatus of the present embodiment permits the automatic feed device 30 to be utilized in the same manner as described in connection with FIGS. 1 and 2. The automatic feed device used with the present embodiment is entirely identical in construction and arrangement to that used with the embodiment of FIG. 1 or 2, that is, it is detachably or permanently secured to the rightward upper portion of the main body of the copying apparatus so that it may be used exclusively for the feeding of sheet-like originals. From a pile of sheet-like originals 63 placed in the sheet original supporting bed 62 of the automatic feed device 30, an uppermost one is separated by a separating roller 64 in synchronism with the rotation of the drum 8 and advanced to a set of drawing rollers 65. The sheet-like original passed between the drawing rollers 65 further passes between transport rollers 66 to an illuminating section 67. At the illuminating section 67, the sheet-like original is illuminated not by the illumination lamp 3 used during the mirror scanning, but by an illumination lamp 44 disposed within the automatic feed device 30, through a transparent glass plate 68. After leaving the illuminating section 67, the sheet original is further passed between transport rollers 69 and discharge rollers 70 and into an original discharge tray 71. Likewise, the sheet originals 63 in the sheet original supporting bed 62 are fed one after another in the order of top to bottom. Thus, the sheet originals discharged into the original discharge tray 71 are piled in the same order as they have been piled in the sheet original supporting bed 62.

In any of the three embodiments shown in FIGS. 1 to 3, the copying apparatus of the present invention is provided with the sheet original transport means disposed at the righthand side of the original supporting surface as viewed in the drawings, namely, at the terminal side of the exposure stroke designated by the arrow which also indicates the direction of velocity of movement $v$.

This is an arrangement which permits the sheet original transport means to be mounted without interfering with the original supporting surface and the space above it (the space available for a thick original to be placed) and thus, image originals of different types may be set in place independently of each other both for the copying mode utilizing the original supporting surface and the copying mode utilizing the sheet original transport means. In other words, copying of sheet-like originals may be effected while a thick original rests on the original supporting surface.

By modifying the arrangement of the optical system and the mechanical construction, it will also become possible to provide the sheet original transport means at the starting end of the exposure stroke on the original supporting surface. In this case, however, the sheet original supporting bed will jut out over the original supporting surface as may be supposed from the drawing, and to avoid this, the sheet original transport means must be considerably spaced apart from the original supporting surface. Usually, the starting end of the exposure stroke is the reference position of the original supporting surface (the reference position to which one end of the original is adjusted) and therefore, if the sheet original transport means is mounted in place, it will form a hindrance particularly when copying is effected with a book opened and placed astride of the reference position.

Higher copying speed of the copying apparatus will involve limitations in various steps of copying (primary charging, exposure, discharging, development, fixation, etc.) and above all, the insufficient quantity of image light projected upon the photosensitive medium will offer a great barrier. To overcome this, it has heretofore been the practice to increase the power consumption of the illumination lamp to thereby increase the quantity of illuminating light and to decrease the F-number of the lens (namely, to use a large and bright lens). This conventional system, if a high-speed copying apparatus is desired, would necessarily result in an increased power consumption and an increased size of the apparatus.

The present invention intends to compensate for the insufficient quantity of light from an overall point of view and this will hereinafter be described by comparing the embodiments of FIGS. 1, 2 and 3.

General properties of the quantity of exposure will first be discussed. In FIGS. 6 and 7, the image original plane 0.P. is illuminated by an illumination lamp La and projected upon the image plane I.P. by a lens Le. If the projection is of magnification 1×, the distance $l$ between the lens and the image plane will be: $l = 2f$, where $f$ is the focal length of the lens. If the slit exposure system is used, the slit will be located at a certain relative position with respect to the optical axis of the lens, as indicated by I.A. in FIG. 6. The width of the slit is defined as 2w and is determined by the size of the original to be copied, and $2w \div 300$mm in a design which permits copying of originals up to size A3. It is also assumed that the slit lies at a distance $e$ from the optical axis. In the construction of the transmission type lens as shown in FIG. 6, designing with $e = 0$ will be more advantageous (as will later be described) and in fact, it is most often the case that design is made with $e = 0$, except for other special case. However, in the construction of the reflection type lens (in-mirror lens) as shown in FIG. 7, the slit of the original and the slit of the formed image lie in the same plane and therefore, $e$ has a certain value of positive sign so that these two slits may not overlap each other. The illumination of the projected light should desirably be uniform over the entire slit width $2w$, but the illumination is greatly reduced at the opposite ends of the slit due to what is called "the rule of cosine to the fourth power". To compensate for this, the luminous intensity at the opposite ends of the lamp La may be increased or the slit may be made broader toward the opposite ends thereof than at the center thereof (FIG. 8), but in any case, the illumination at the opposite ends of the slit forms a limitation in enhancing the copying speed. Accordingly, description will now be made with attention paid to the illumination at the opposite ends of the slit.

In FIG. 6, the illumination E on the image plane in:

$$E \propto \cos^4\theta \times 1/f_{NO}^2 \times I_o,$$

where $\theta$: the angle formed by the straight line passing through the center of the lens and one end of the slit with the optical axis;
$F_{NO}$: F-number of the lens;
$I_o$: light intensity on the surface of the image original.
Since $$\cos\theta = \frac{l}{\sqrt{l^2 + w^2 + e^2}},$$

the above formulation may be rewritten thus:

$$E = \frac{1}{1 + \frac{2(w^2 + e^2)}{l^2} + \frac{(w^2 + e^2)^2}{l^4}} \times \frac{1}{F_{NO}^2} \times I_o \quad (1)$$

The surface of the image original which is illuminated by the lamp has the light intensity $I_o$ proportional to the illumination thereof (FIGS. 4 and 5) and hence, $$I_o \propto \frac{\cos\alpha}{a^2} \times I_L \quad (2),$$

where
$\alpha$: the angle formed by the straight line passing through the lamp and the slit with the normal to the surface of the image original;
$a$: the distance from the lamp to the slit;
$I_L$: light intensity of the lamp.
By formulations (1) and (2) above, the following is given:

$$E \propto \frac{1}{1 + \frac{2(2(w^2 + e^2))}{l^2} + \frac{(w^2 + e^2)^2}{l^4}} \times \frac{1}{F_{NO}^2} \times \frac{\cos\alpha}{a^2} \times I_l \quad (3)$$

From formulation (3), the following will become apparent,

As already noted, when the F-number ($F_{NO}$) is decreased and the light intensity $I_L$ of the lamp is increased, the illumination on the image plane is increased, of course, and in addition, it will be seen that the illumination on the image plane is increased when:

(1) $l$ is increased ($\theta$ is decreased to decrease the effect of the cos fourth power rule);
(2) $e$ is decreased (" ' ");
(3) $\alpha$ is decreased (the image original is illuminated from just therebelow as far as possible);
(4) $a$ is decreased (the lamp is disposed as close as possible to the image original).

The design shown in FIG. 1 is an example of the copying apparatus in which the available maximum size of the image original is the format A3 and $F_{NO} = 5$ and $f = 240$mm. This example may be said to be an excellent design and arrangement in that the optical axis of the lens is horizontal and that the optical system is compactly arranged to provide a convenient, well-defined space therebelow available to dispose a motor and an electrical control device, but it cannot be said to be excellent in respect of the illumination on the image plane hitherto described. Firstly, the use of the reflection type lens necessarily requires $e$ to be of a certain magnitude. Moreover, its value must be considerably great in order to prevent the second movable mirror 5 from interfering with the other light path. In the design example now under discussion, $e = 93$mm. Secondly, as shown in FIG. 4, the lamp must be disposed to evade the shaded area $d$ of the path of the image light and the dotted area $r$ of regular reflection at which the regular reflection of the lamp comes into the lens and therefore, $\alpha$ and $a$ must unavoidably be great. Thus, this design example is not advisable in items (2), (3) and (4) above. For comparison with the other design examples, the image plane illumination in this example is given as 100% (standard).

In the example of FIG. 2, a transmission type lens is used to realize $e = 0$ and thereby compensate for the above-noted disadvantages. Again, this design example is of a copying apparatus with format A3 as the maximum available size of the image original and calling for $F_{NO} = 5$ and $f = 225$mm as reasonable design.

This design example is excellent in item (2) above and as seen in FIG. 5, the area $d$ of the path of image light and the area $r$ of regular reflection are concentrated in a narrow portion to enable $\alpha$ and $a$ to be smaller and this is advisable in items (3) and (4) as well. In this example, the image plane illumination, if calculated, will be 148%, as compared with the example of FIG. 1.

In the present design example, the lens 31 intervenes between the second movable mirror 5 and the drum 8 and when the construction of the apparatus body is considered with the center of the drum 8 as the reference, the transparent glass plate 2 is deviated rightwardly by an amount corresponding to the lens and this means a disadvantage that the apparatus body is somewhat bulkier toward the right.

To eliminate such a disadvantage, in the design example of FIG. 3, the lens 40 is disposed between two stationary mirrors 38 and 41 (although the mirror 38 is a change-over mirror which is changed over when the automatic feed device is used), and the transparent glass plate is leftwardly shifted to make the main body compact. Thus, in this example, the main body is smaller in size by about 100mm than in the example of FIG. 2, and by about 50 mm than in the example of FIG. 1. Again, this copying apparatus is designed to copy image originals of up to format A3 and the lens is designed with $F_{NO} = 5$ and $f = 250$mm. The image plane illumination in this example, when calculated, is 149% which means an excellence over the example of FIG. 2 and also the effectiveness mentioned in item (1) above.

Further, this copying apparatus adopts an improved separation system which makes the apparatus more reliable. In the past, an endless belt having a thickness of 0.1mm and a width of about 3mm has been disposed at a position whereat one side edge of copy medium is caught by the belt. Such belt is strong enough to draw the copy medium apart from the photosensitive drum but it has often been broken when a copy medium inadvertently caught by the belt or jammed within the apparatus has been taken out without some special care being paid thereto.

Figure 9:
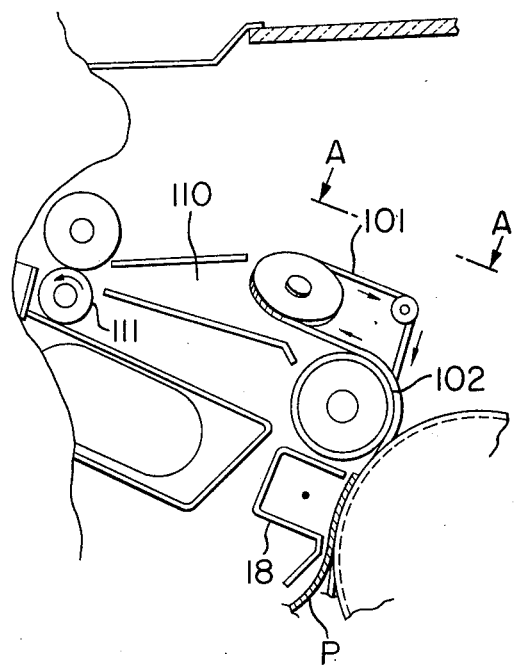
FIGS. 9 and 9' are cross-sectional views showing the separating section according to the present invention.
Figure 9:
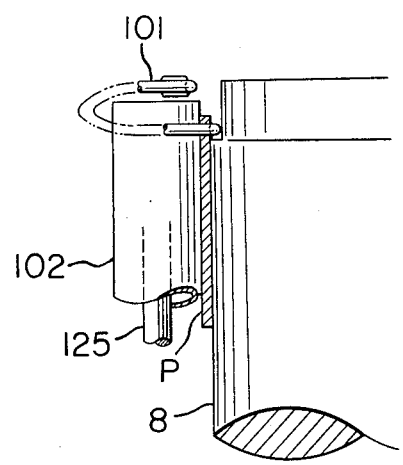

In the present copying apparatus, as seen in FIGS. 9 and 9', a resilient, round belt formed of urethane rubber or like material and having a diameter of several millimeters (of the order of 4mm) is extended as separtion belt 101. The portion of the photosensitive drum surface which is opposed to the belt is recessed with respect to the surface of the photosensitive layer by an amount corresponding to the diameter of the round belt. Accordingly, the use of the round belt does not impart any unreasonable force to a copy medium P as it passes through the image transfer section.

Figure 11:
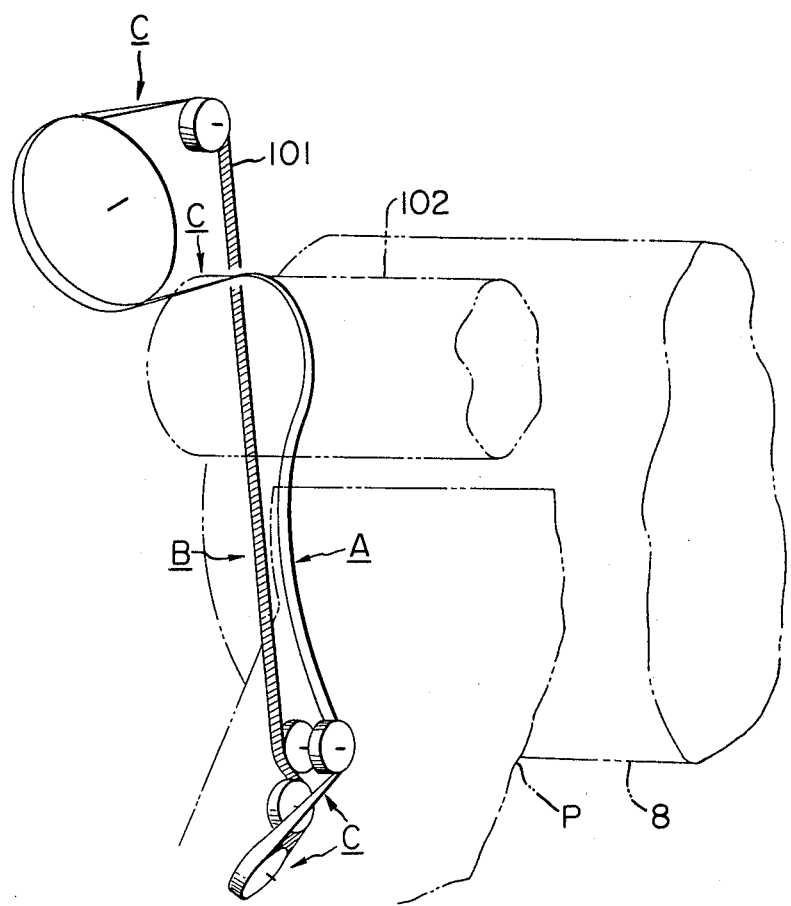
FIG. 11 is a detailed perspective view of the separating section.

In addition, such a round belt has a greatly enhanced mechanical strength as the belt. The conventional belt has involved the necessity of designing the belt with a special consideration so as to minimize the torsion of the belt. (See FIG. 11, in which torsions are present at portions C for spacing the active side A of the separation belt apart from the return side B of the belt). Nevertheless, the repeated torsion of the belt has fatigued the belt so that the belt has been broken at last after production of several tens of thousand copies. In contrast, the round belt is much stronger for torsion and its life is as long as the life of the copying apparatus.

The copying apparatus of the present invention is characterized in that is has the automatic feed device for sheet originals as already described. In the design examples of FIGS. 1 and 2, the lens is parallel-moved, and in the design example of FIG. 3, one of the mirrors is swung. In any case, another new light path is formed by that. As a specific example of this, the mirror change-over portion which is applicable to the design example of FIG. 3 will be described in detail by reference to FIG. 10 (See FIG. 3 also).

Figure 10:
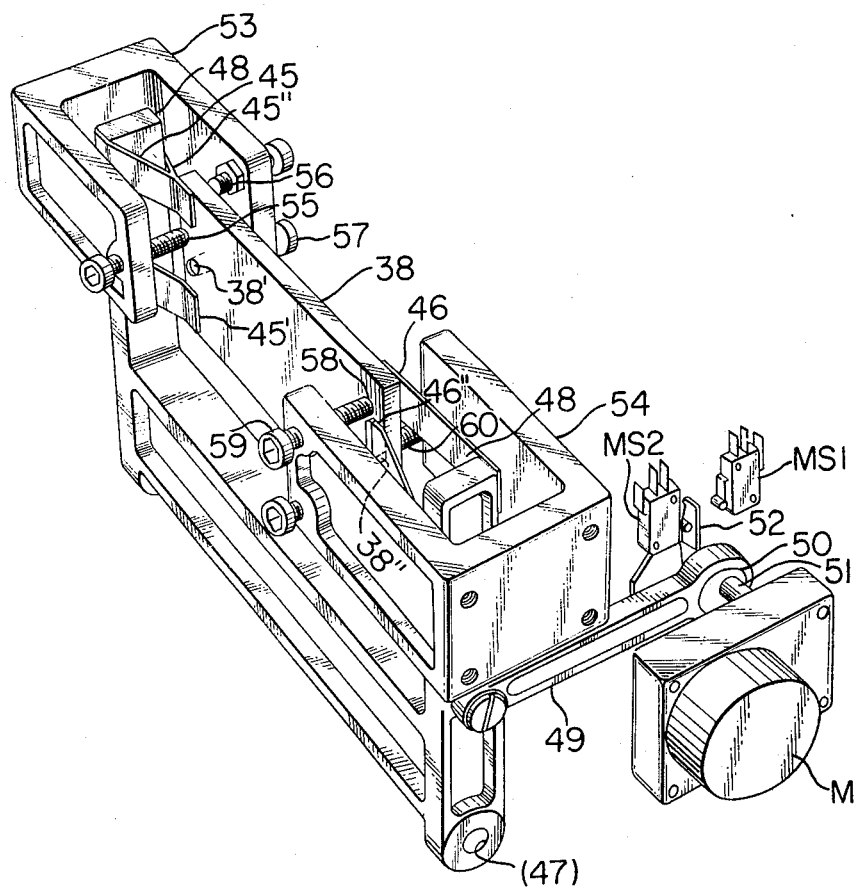
FIG. 10 is a perspective view showing the mirror change-over section according to the present invention.

The change-over mirror 38 is loosely held by holding plate springs 45, 45', 45", 46, 46' and 46" (although 46' is not seen in FIG. 10). Dowels are caulked in the plate springs 45" and 46" to prevent the mirror 38 from slipping down and they are loosely fitted in holes 38' and 38" formed in the mirror. These means are not restricted to the shown forms, but essentially it will suffice for the mirror 38 to be resiliently held. These plate springs are attached to an arm 48 pivotable about a shaft 47 secured to the main body. By a link 49, the arm 48 is connected to an eccentric cam 50 secured to the output shaft 51 of a motor M provided with reduction gears, so that the arm is pivotable by revolution of the motor. Secured to the link 49 is a member 52 for actuating switches MS1 and MS2 which control the operation of the motor. With the aid of these switches and an unshown switch provided in the operating portion, the mirror may assume two positions, namely, a rightwardly forced position and a leftwardly forced position. Stationary blocks 53 and 54 are secured to the main body frame, and pins 55–60 for determining the plane of the mirror are secured to these blocks. In FIGS. 1 and 10, the mirror is leftwardly swung and positioned in place there while being firmly urged against the ends of the pins 55, 58, 59 by the plate springs 45", 46, 46' opposed thereto. This is the position which permits the use of the automatic sheet original feed device. When the mirror is swung in the opposite direction, it will be positioned while being urged against the pins 56, 57, 60.

If the pins 55–60 are threaded and fastened by nuts, as shown, the optical adjustment work during the assembly process will become easier to do. In the shown example, the change-over of the mirror is effected by the motor, but it is of course possible to make such a design that the change-over may be manually accomplished with the aid of a change-over lever or the like.

The copying apparatus of the present invention, as has hitherto been described, is compact and energy-saving and yet capable of high-speed copying, and provided with an automatic sheet original feed device. Moreover, although not described in detail, it has two feeding sections and in addition, an auxiliary cassette.

Further, the separation belt which has been a weak point of the copying apparatus is improved to eliminate any trouble which would otherwise result from the separation belt.

What we claim is:
1. A copying apparatus comprising:
an original supporting table having a transparent plate for supporting thereon an original to be copied;
scanning mirror means having first and second movable mirrors for scanning the original placed on said original supporting table;
a third mirror disposed with said scanning means to form a first optical path extending to a photosensitive member, said third mirror being fixed during scanning operation of said scanning mirror means;
lens means, disposed across the first optical path, for focussing an image of the original on the photosensitive member,
said first and second mirrors being movable without varying the length of the first optical path to project the image of the original in focus on the photosensitive member; and
means for pivoting the third mirror to vary an angle of reflection thereof to form a second optical path extending through said lens means, independently of said scanning mirror means, to project an image of another original onto the photosensitive member.

2. An apparatus according to claim 1, wherein the first optical path is for stationary originals, and the second optical path is for moving originals.

3. An apparatus according to claim 1, wherein the second optical path is formed, when said scanning mirror means is moved to a position whereat it is out of interference with said second optical path.

4. An apparatus according to claim 1, wherein said second optical path is formed so as not to interfere with said original supporting table at a terminal end of an exposure stroke of said scanning mirror means.

5. A copying apparatus comprising:
an original supporting table having a transparent plate for supporting thereon an original to be copied;
scanning mirror means having first and second movable mirrors for scanning the original placed on said original supporting table;
a third mirror disposed with said scanning means to form a first optical path extending to a photosensitive member, wherein said third mirror is fixed on a body of the copying apparatus;

lens means, disposed across the first optical path, for focussing an image of the original on the photosensitive member;

said first and second mirrors being movable, without varying the length of the first optical path, to project the image of the original in focus on the photosensitive member;

means for moving said lens means substantially parallel in a plane substantially perpendicular to the optical axis thereof to form a second optical path extending through said lens means, independently of said scanning mirror means, to project an image of another original onto the photosensitive member.

6. A copying apparatus comprising:

a photosensitive member disposed substantially centrally of a body of the apparatus;

an original supporting table having a transparent plate for supporting thereon an original to be copied;

scanning mirror means having first and second movable mirrors for scanning the original placed on said original supporting table;

copy processing means including a sheet feeding section, a sheet transporting section, an image transfer section and an image fixing section which are disposed substantially at one lateral side of said photosensitive member, an image formation system having third and fourth stationary mirros which are disposed substantially at the other lateral side of said photosensitive member, a developing section disposed below said photosensitive medium, and a cleaning section disposed above said photosensitive member;

said third and fourth mirrors being disposed with said scanning means to form a first optical path extending in the form of a "W", from the first mirror to the second mirror, from the second mirror to the third mirror, from the third mirror to the fourth mirror, and then from the fourth mirror to the photosensitive member;

lens means, disposed across the first optical path, for focussing an image of the original on the photosensitive member;

said first and second mirrors being movable without varying the length of the first optical path to project the image of the original in focus on the photosensitive member; and means for pivoting the third mirror or moving said lens means to form a second optical path extending through said lens means but without interference with said scanning mirror means to project an image of another original onto the photosensitive member.

7. An apparatus according to claim 6, wherein a part of the first optical path extending from the first mirror to the second mirror is inclined with respect to a surface of the transparent plate at an angle of 8° – 20°.

8. An apparatus according to claim 6, wherein said lens means is disposed between said second and third mirrors.

9. An apparatus according to claim 6, wherein said lens means is disposed between said third and fourth mirrors.

10. An apparatus according to claim 6, wherein an optical axis of said lens means is included in the optical path across which said lens means is disposed.

11. An apparatus according to claim 6, wherein an in-mirror lens is used as both said third mirror and said lens means.

* * * * *

UNITED STATES PATENT AND TRADEMARK OFFICE
CERTIFICATE OF CORRECTION

PATENT NO. : 4,080,064            Page 1 of 2

DATED : March 21, 1978

INVENTOR(S) : SHIGEHIRO KOMORI, ET AL

It is certified that error appears in the above-identified patent and that said Letters Patent are hereby corrected as shown below:

Column 3, line 8, delete "4";

line 9, change "mirror" to read --mirrors 4 and--;

line 14, delete "positive" (first occurrence);

line 22, change "AC" (second occurrence) to read --a--;

line 53, change "contains" to read --contain--;

line 66, after "mediums" insert --may--.

Column 5, line 31, change "to" to read --and--;

line 32, delete "be".

Column 6, line 65, change "$\div$" to read --$\doteq$--.

Column 7, line 22, change "in" to read --is--.

Equation 3, change "E$\alpha$" to read --$E^{\alpha}$--; change "2( 2(" to read --2(--; change "1" to read --$1^4$--; and change "$I_1$" to read --$I_L$--.

UNITED STATES PATENT AND TRADEMARK OFFICE
CERTIFICATE OF CORRECTION

PATENT NO.   :   4,080,064
DATED        :   March 21, 1978
INVENTOR(S)  :   SHIGEHIRO KOMORI, ET AL It is certified that error appears in the above-identified patent and that said Letters Patent are hereby corrected as shown below:

Column 8, line 3, change "('''')" to read --θ is decreased to decrease the effect of the cos fourth power rule)--.

Column 9, line 15, change "separtion" to read --separation--.

Column 11, line 31, change "mirros" to read --mirrors--.

Signed and Sealed this

Twenty-first Day of November 1978

[SEAL]

Attest:

RUTH C. MASON
Attesting Officer

DONALD W. BANNER
Commissioner of Patents and Trademarks